United States Patent [19]
Hsiao

[11] Patent Number: 5,771,834
[45] Date of Patent: Jun. 30, 1998

[54] DOUBLE TIRE INFLATION BALANCER AND TIRE PRESSURE INDICATOR

[76] Inventor: Jing-Long Hsiao, No.55-1, Tuan-Chu Lane, Tuan-Chu Li, Chia-I City, Taiwan

[21] Appl. No.: 725,479

[22] Filed: Oct. 4, 1996

[51] Int. Cl.⁶ ............................. B60C 23/04; G01L 17/00
[52] U.S. Cl. ........................ 116/34 R; 73/146.8; 116/272
[58] Field of Search .................................. 116/34 R, 266, 116/268, 272; 137/227; 73/146.2

[56] References Cited

U.S. PATENT DOCUMENTS

| | | | |
|---|---|---|---|
| 1,268,467 | 6/1918 | Jacobson et al. | 137/227 |
| 1,807,752 | 6/1931 | Poster | 73/146.8 |
| 3,235,684 | 2/1966 | Jordan et al. | 137/227 |
| 3,260,233 | 7/1966 | Begunder | 116/34 R |
| 4,059,823 | 11/1977 | Martin et al. | 116/34 R |
| 4,520,664 | 6/1985 | Kramer | 73/146.8 |
| 5,505,080 | 4/1996 | McGhee | 73/146.5 |

*Primary Examiner*—William A. Cuchlinski, Jr.
*Assistant Examiner*—Willie Morris Worth
*Attorney, Agent, or Firm*—Bacon & Thomas

[57] ABSTRACT

A double tire inflation balancer and tire pressure indicator including a main body, a tire pressure indicator and an inflation tube. The tire pressure indicator is disposed in the main body and the main body is connected to the tire valve by an inflation hose. A pair of one-way valves formed by the round head rods and the small springs are provided in the main body, during inflation, the air first goes into the tire with less tire pressure. After the pressure of the inner tire is equalized with that of the outer tire, the two tires are then simultaneously inflated until the tire pressure reaches a normal pressure value. A transmission piston of the tire pressure indicator is compressed by the air, whereby a user can observe three indications of red, green and yellow colors of the front end of the transmission piston. The red color indicates insufficient tire pressure, the green color indicates normal tire pressure, while the yellow color indicates excessive tire pressure. The driver can inflate or deflate the tire according to the color indication.

3 Claims, 7 Drawing Sheets

DOUBLE TIRE INFLATION BALANCER AND TIRE PRESSURE INDICATOR

BACKGROUND OF THE INVENTION

The present invention relates to a double tire inflation balancer and tire pressure indicator which enables a drive to more accurately and conveniently check the tire pressure and inflate the tire so as to ensure safety in driving and save fuel and tire cost.

Various kinds of tire pressure measuring devices are known to check whether the tire pressure is normal. Several shortcomings exist in these devices as follows:

1. When lacking a measuring device, a driver can only judge whether the tire pressure is normal from the appearance of the tire. This is unreliable and cannot provide determination that the tire pressure is sufficient.
2. The conventional tire pressure measuring device can only measure and indicate a single tire pressure, while being unable to adjust the unbalanced pressure between two tires.
3. With respect to a truck with double wheels, the inflation valve is disposed on an outer periphery of the tire so that the tire on the outer side can be conveniently inflated, while the tire on the inner side must be inflated in such a manner that the driver is first required to be under the chassis of the truck and then connect the inflation hose to the inflation valve of the inner tire. This is troublesome to the driver.
4. With respect to the truck with double wheels, in the case of unbalanced tire pressure, during running, the two tires will suffer uneven force. Therefore, the tire on one side is subject to over-abrasion and deformation and may explode. Therefore, the uneven tire pressure will lead to increased of consumption of fuel, deformation of the rim or even explosion of the tire. This is extremely dangerous to the driver and the others.

SUMMARY OF THE INVENTION

It is therefore a primary object of the present invention to provide a double tire inflation balancer and tire pressure indicator which shows different colors to indicate the present state of the tire pressure and remind the driver to inflate the tire and balance the tire pressure.

It is a further object of the present invention to provide the above indicator which avoids over-abrasion, deformation or even explosion of the tire so as to save the cost for the tire and rim and prevent abnormal fuel consumption as well as ensure safety in driving.

It is still a further object of the present invention to provide the above indicator which is disposed on the rim of the tire, enables the driver to conveniently inflate both the inner tire and outer tire and balance the tire pressure without going down under the chassis of the truck.

It is still a further object of the present invention to provide the above indicator in which the inflation adaptor of the inflation pump only needs to be connected with the inflation adaptor of the indicator so as to unify and inflate both the inner and outer tires.

The present invention can be best understood through the following description and accompanying drawings, wherein:

DETAILED DESCRIPTION OF THE PREFERRED EMBODIMENT

Figure 1:
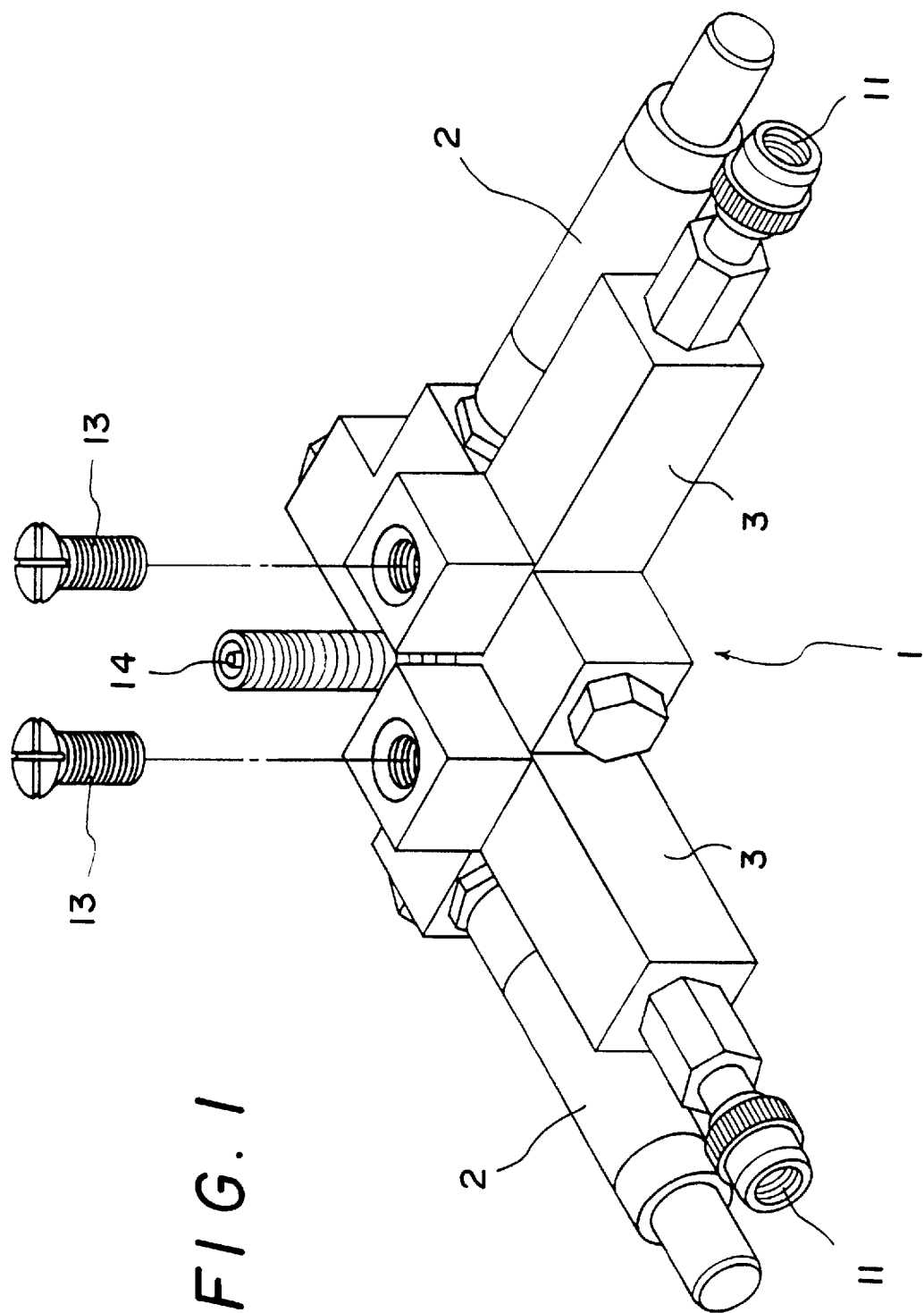
FIG. 1 is a partially exploded perspective view of the present invention.
Figure 2:
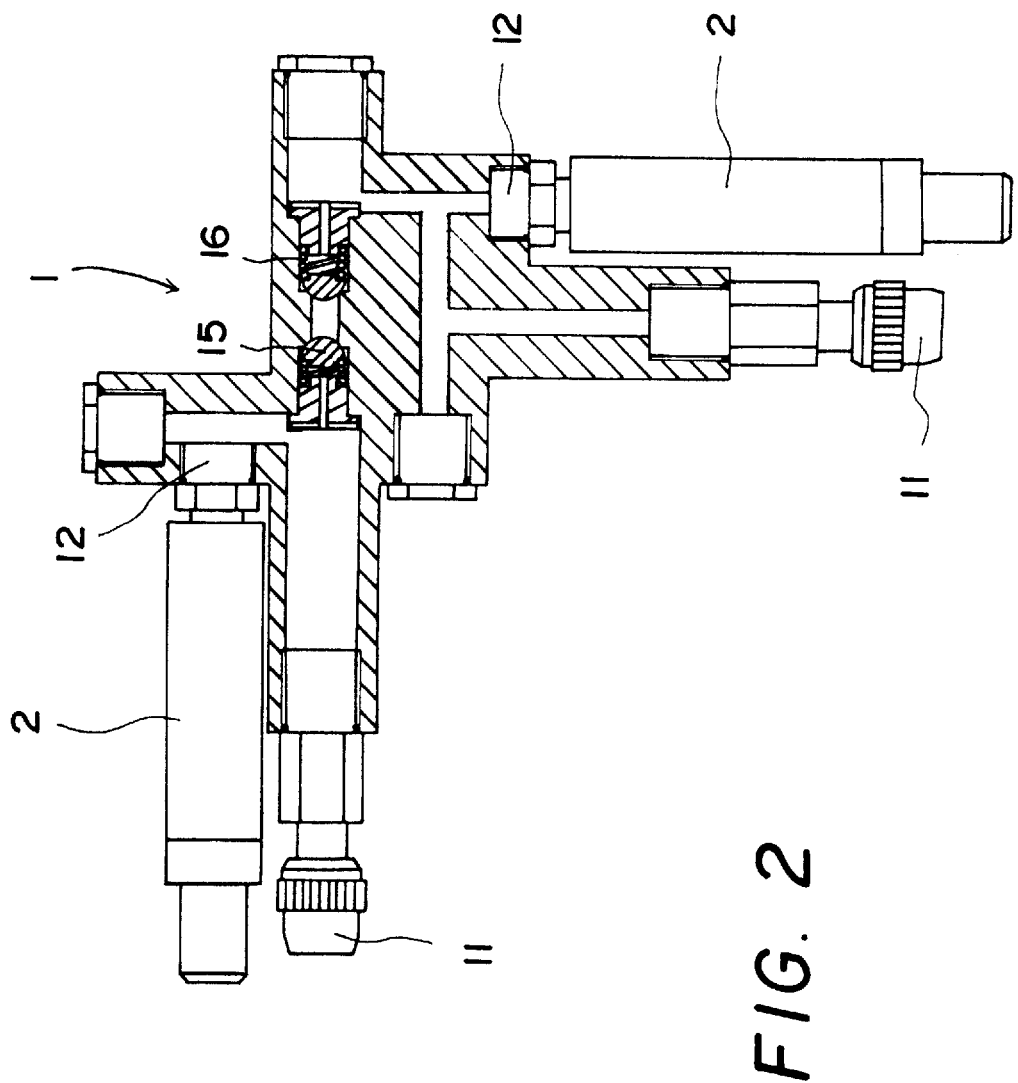
FIG. 2 is a sectional view of the tire pressure indicator of the present invention.
Figure 3:
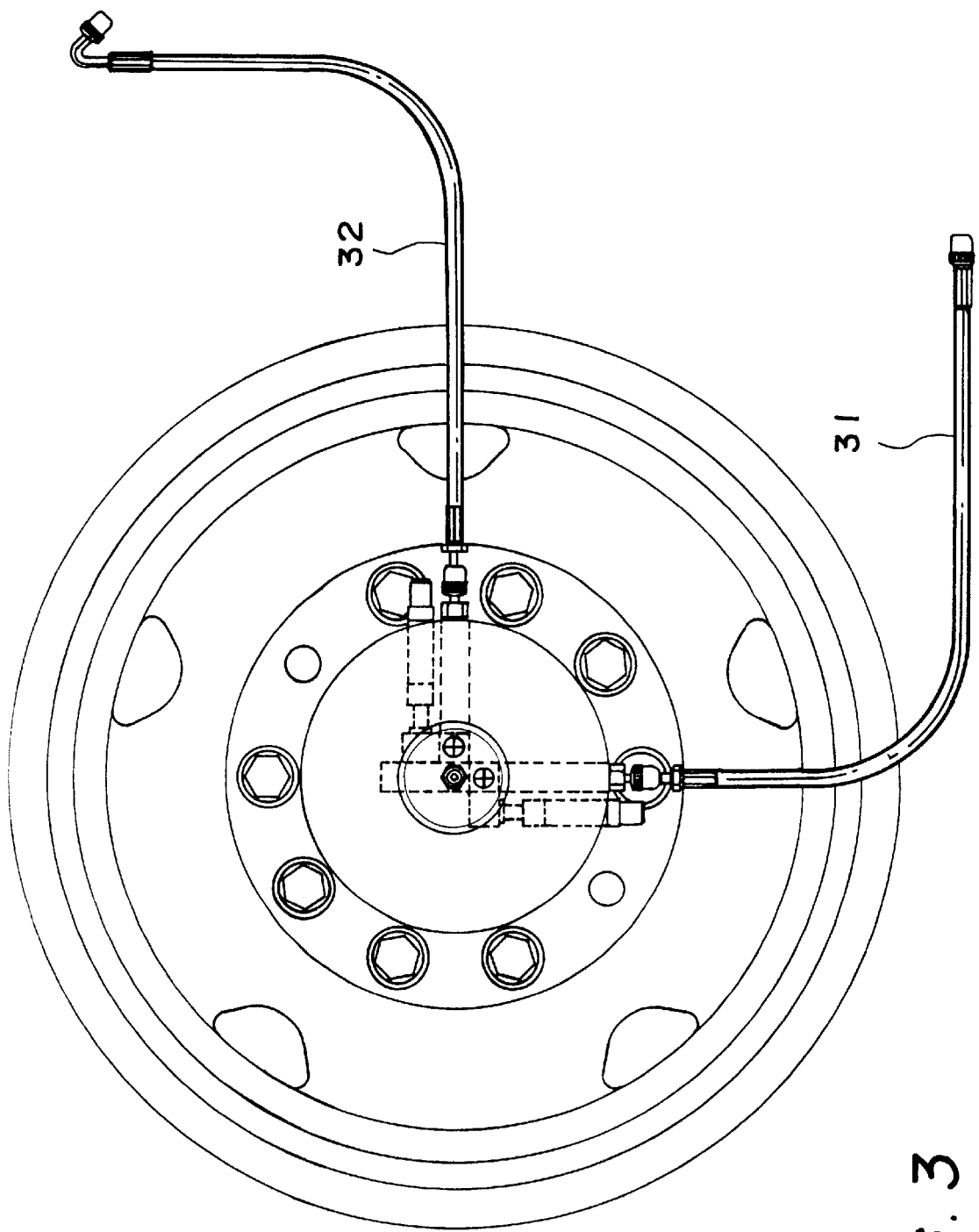
FIG. 3 is a front view of the present invention.

Please refer to FIGS. 1 and 2. The present invention includes a main body 1, a pair of tire pressure indicators 2 and a pair of an inflation tubes 3.

Figure 4:
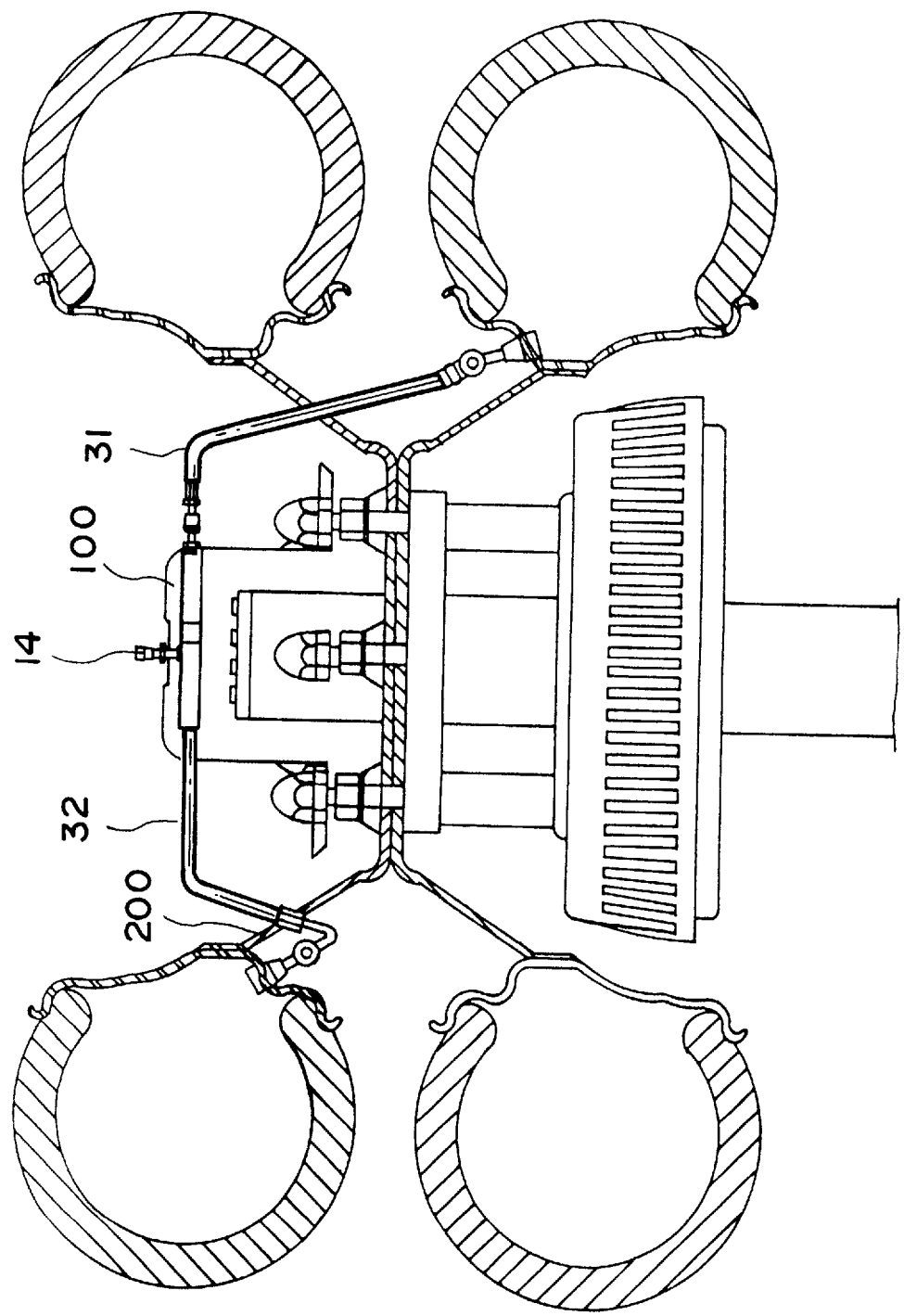
FIG. 4 is a sectional view showing the present invention installed on a pair of wheel assemblies.
Figure 5:
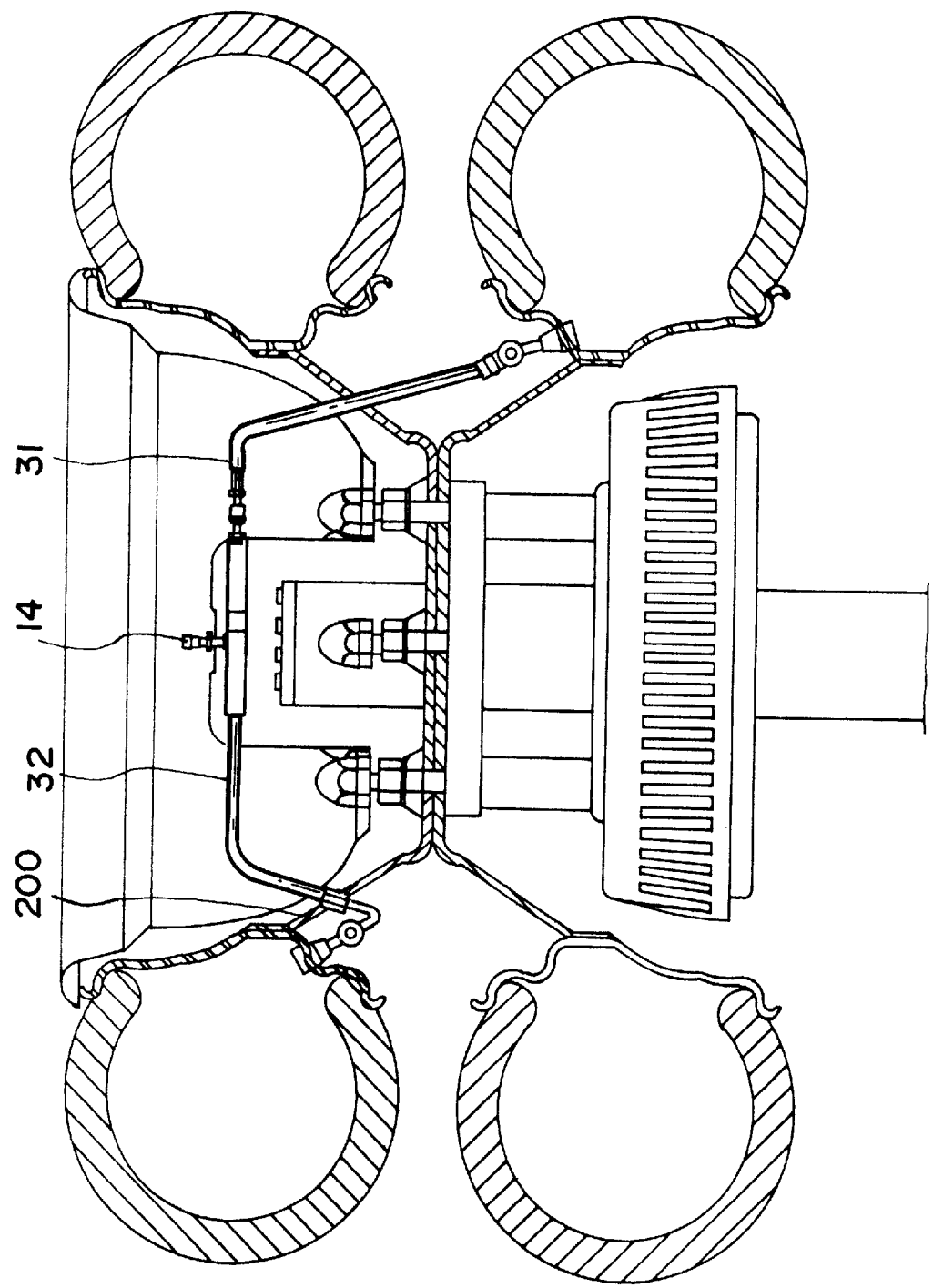
FIG. 5 is a sectional view showing the application of the present invention in another state.

The main body 1 is integrally made of metal material and disposed with two inflation adaptors 11, an indicator adaptor 12 and several nuts. The main body 1 is assembled with a housing 100 as shown in FIG. 4 by a fastening screw 13. Each side under the inflation valve 14 is disposed with a round head rod 15 and a small spring 16 which collectively define a one-way fluid value.

Figure 6:
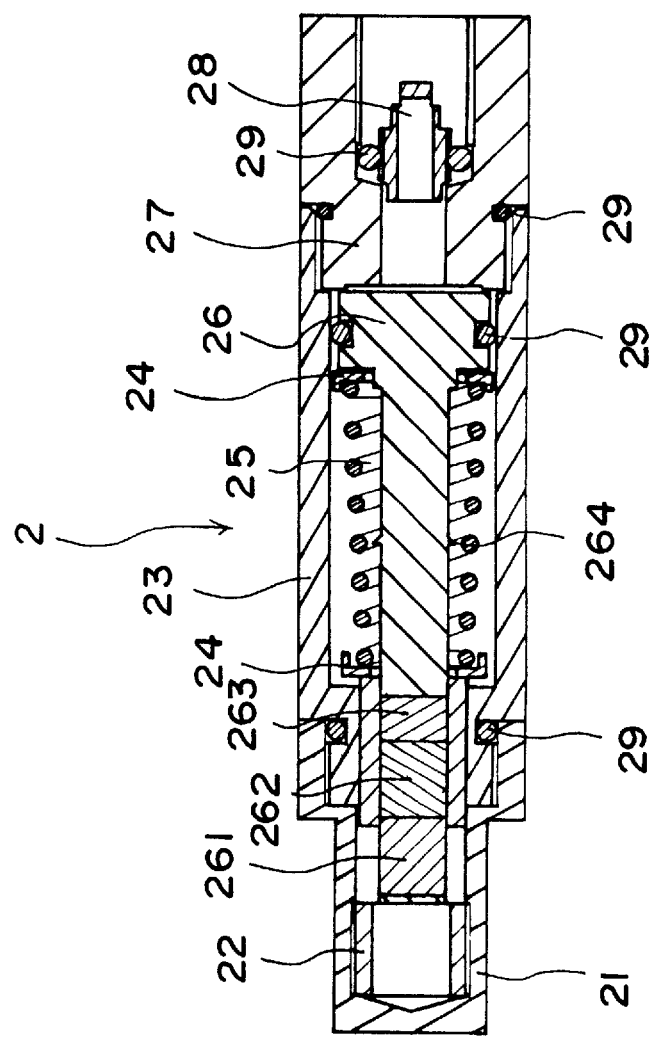
FIG. 6 is a sectional view of the indicator of the present invention.
Figure 7:
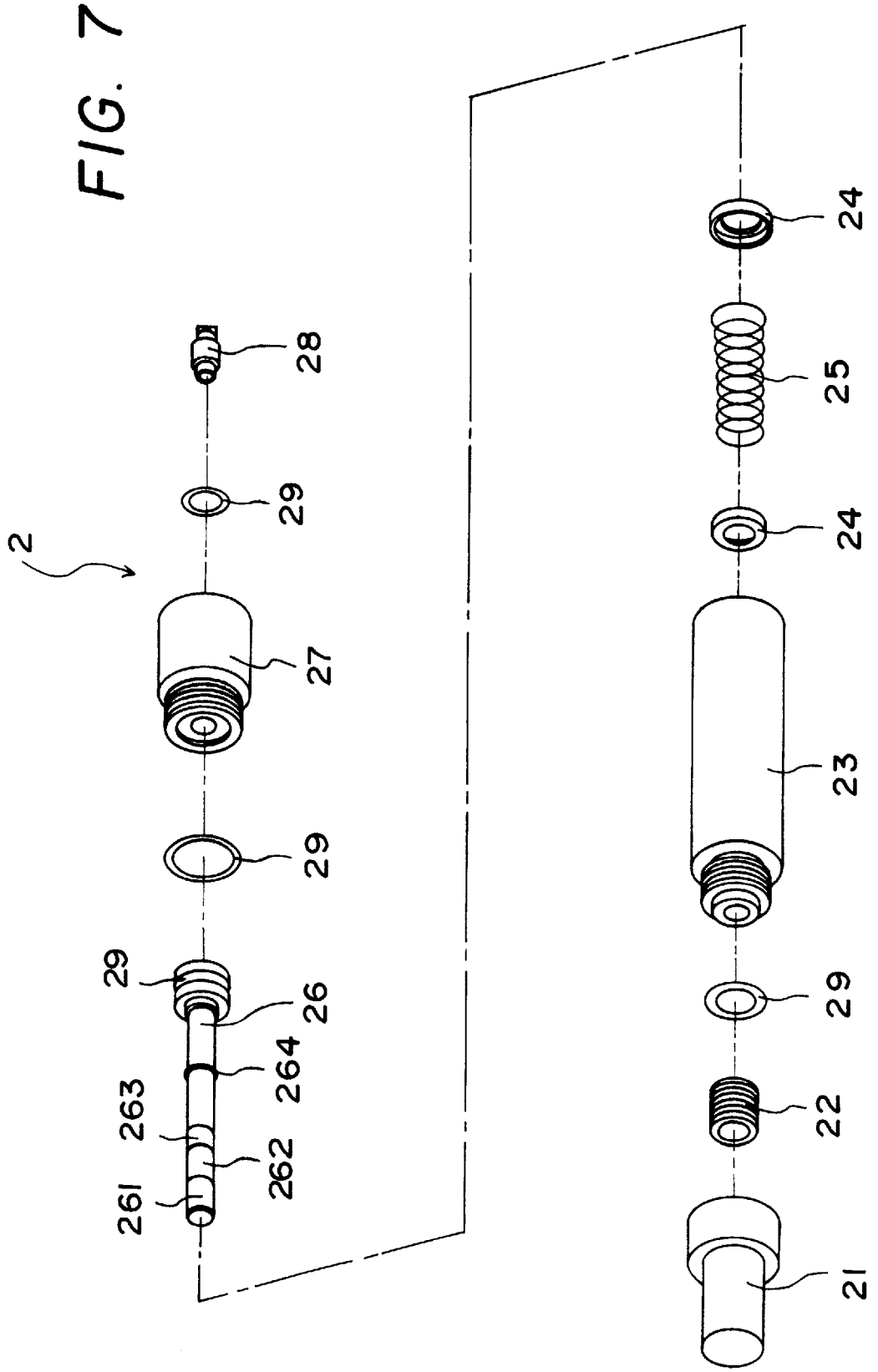
FIG. 7 is a perspective exploded view of the indicator of the present invention.

Referring to FIGS. 6 and 7. The tire pressure indicator 2 is composed of a dustproof cover 21, a fastening screw 22, a sleeve 23, a spring fixing seat 24, a spring 25, a transmission piston 26, a stepped nut 27, a valve push pin 28 and several O-rings 29.

The inflation tubes 3 are connected to an inner tire inflation hose 31 and an outer tire inflation hose 32 according to the arrangement of the inner and outer tires. Each inflation tube 3 has an air inlet and an inflation adaptor 11.

When assembled, each indicator adaptor 12 of the main body 1 is connected with a stepped nut 27 of the tire pressure indicator 2 to form the structure as shown in FIG. 1. The structure is then secured to the housing 100 by the fastening screws 13. The air inlets of the inner and outer tire inflation hoses 31, 32 are connected with the inflation adaptors 11 of the main body 1, while the air outlets of hoses 31, 32 are connected with the air valves of the tire. The assembly is then fixed in the tire rim 200 by screws.

Before driving the truck, the driver can observe the color of the transmission piston 26 shown from the transparent dustproof cover 21 of the tire pressure indicator 2 inside the tire rim 200. In the case of totally red front end 261, it is indicated that the tire pressure is insufficient by 10%. In the case of half red and half green, it is indicated that the tire pressure is insufficient by 5%. At this time, the inflation hose of an inflation pump is connected to the inflation valve 14 of the main body 1 to start inflating the tire. The pressurized air passes from the inflation valve 14 to the main body 1. By means of one-way valves defined by the round head rods 15 and the small springs 16, the air is directed first to the tire with less tire pressure. After the pressure of the inner tire is equalized with that of the outer tire, the two tires are then simultaneously inflated until the tire pressure reaches a normal pressure value, and, the transmission piston 26 of the tire pressure indicator 2 presents green color 262. In the event the transmission piston 26 of the tire pressure indicator presents green color 262 during a tire check prior to driving, it is indicated that the present tire pressure is normal and it is safe to drive the truck. In the event the transmission piston shows yellow color 263, it is indicated that the tire pressure is too high and it is necessary to partially relieve the tire pressure until the green color 262 is shown.

In case the tire on one side is flat or exploded, the round head rods 15 serve to prevent the tire on the other side from being flat at the same time since pressurized air is only permitted to flow in a one-way direction from inflation valve 14 to inflation tubes 3. Therefore, the tire on one side remains under normal condition. In addition, the present invention is installed at the shaft of the tire rim 200 without eccentrically affecting the normal rotation of the tire. When inflating, the tires on both sides can be simultaneously inflated through the inflation valve 14 of the main body. Therefore, it is unnecessary to separately inflate the two tires so inflation time is saved.

The tire pressure indicator 2 is operated in such a manner that after the pressurized air is admitted into the main body from valve 14 and through the round head rods 15, compressing the small springs 16, the air arrives at the inflation adaptor 11 and the indicator adaptor 12. The air at the inflation adaptor 11 directly flows into the tire, while the air at the indicator adaptor 12 passes through the valve push pin 28 to push the transmission piston 26 which in turn compresses the spring 25 in the spring fixing seat 24, causing either the red color 261, green color 262 or yellow color 263 of the front end of the transmission piston 26 to extend according to different pressures. In the case of great pressure, the spring 25 is compressed to a greater extent and the transmission piston 26 extends by a larger length so that the yellow color 263 is seen. On the other hand, in the case of small pressure, the transmission piston 26 is restored to its original position and the red color 261 can be seen through the transparent dustproof cover 21. In addition, when the transmission piston 26 is depressed to extend and show the yellow color 263, due to restriction of the engaging ring 264, it can only extend to the bottom end of the dustproof cover 21. The other function of the dustproof cover 21 is to prevent the air from leaking in case the O-ring 29 of the transmission piston 26 fails. Also, the spring 25 can be replaced with different ones according to various tire pressures of all kinds of vehicles. Different springs 25 will have different test pressure values so that they will bear different tire pressure values. The fastening screw 22, sleeve 23, stepped nut 27 and O-ring 29 all serve to avoid leakage of air and secure the tire pressure indicator 2.

The advantages of the present invention are as follows:

1. The tires on inner and outer sides can be inflated at the same time. The tire with less tire pressure is first inflated until the tires on both sides have identical tire pressure and then the tires are simultaneously inflated to reach normal tire pressure.
2. The present invention provides a tire pressure checking and inflation measure which is more accurate and convenient than known devices of this type.
3. The installation of the present invention will not affect the rotation of the tire and does not present the possibility of leakage of air.
4. The present invention ensures safety in driving and saves fuel and cost.

The above embodiment is only an example of the present invention and the scope of the present invention should not be limited to the example. Any modification or variation derived from the example shall fall within the scope of the present invention.

What is claimed is:

1. A double tire inflation balancer and tire pressure indicator comprising:
   a) a main body including a first inflation tube and a first pressure indicator in fluid communication with each other, a second inflation tube and a second pressure indicator in communication with each other, an inflation valve for emitting pressurized air into the main body, a first one-way valve permitting pressurized air to only flow from the inflation valve to the first inflation tube and first pressure indicator, a second one-way valve permitting pressurized air to only flow from the inflation valve to the second inflation tube and the second pressure indicator;
   b) each inflation tube including an inflation adaptor for connecting the inflation tube to an air valve of a tire by an inflation hose; and
   c) each pressure indicator including a visual indicator for indicating an air pressure in each tire.

2. The inflation balancer and tire pressure indicator of claim 1 wherein each visual indicator includes a spring-biased piston and a plurality of indicating elements of different colors which are exposable in response to the air pressure in the tire.

3. The inflation balancer and tire pressure indicator of claim 1 wherein each one-way valve includes a spring-biased round head rod.

* * * * *